(12) United States Patent
Lim

(10) Patent No.: US 9,381,854 B2
(45) Date of Patent: Jul. 5, 2016

(54) VEHICLE FOR SUPPORTING LIGHTING CONTROL FUNCTION

(71) Applicant: Hyundai Motor Company, Seoul (KR)

(72) Inventor: Hee Cheon Lim, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 112 days.

(21) Appl. No.: 14/291,736

(22) Filed: May 30, 2014

(65) Prior Publication Data

US 2015/0131303 A1    May 14, 2015

(30) Foreign Application Priority Data

Nov. 13, 2013  (KR) .................. 10-2013-0137830

(51) Int. Cl.
*B60Q 1/26* (2006.01)
*B60Q 3/02* (2006.01)

(52) U.S. Cl.
CPC ............ *B60Q 3/0223* (2013.01); *B60Q 3/0253* (2013.01); *B60Q 3/0256* (2013.01); *B60Q 3/0259* (2013.01)

(58) Field of Classification Search
CPC .. B60Q 3/0223; B60Q 3/0253; B60Q 3/0256; B60Q 3/0259
USPC ........................................................ 362/488
See application file for complete search history.

(56) References Cited

U.S. PATENT DOCUMENTS

| 5,709,448 A | * | 1/1998 | Jennings | ................ | B60Q 3/004 362/156 |
| 6,854,869 B1 | * | 2/2005 | Fernandez | ............. | A47C 7/725 297/184.17 |
| 6,982,648 B2 | | 1/2006 | Cros et al. | | |
| 2010/0296302 A1 | * | 11/2010 | Welch, Sr. | ............. | B60Q 3/004 362/471 |

FOREIGN PATENT DOCUMENTS

| JP | 05-270314 | 10/1993 |
| JP | H7-32263 | 7/1995 |
| JP | 2010146996 A | 7/2010 |
| KR | 10-1997-0009514 | 6/1997 |
| KR | 20-1998-021420 U | 7/1998 |
| KR | 20-0147133 | 6/1999 |

* cited by examiner

*Primary Examiner* — Anh Mai
*Assistant Examiner* — Hana Featherly
(74) *Attorney, Agent, or Firm* — Mintz Levin Cohn Ferris Glovsky and Popeo, P.C.; Peter F. Corless

(57) ABSTRACT

A vehicle for supporting a lighting control function includes: interior lighting apparatuses configured to include a lighting apparatus of a driver's seat supporting a lighting of the driver's seat and lighting apparatuses for each seat supporting each lighting for each seat; a control apparatus of a driver's seat configured to perform a lighting control of at least one of the lighting apparatus of the driver's seat and the lighting apparatuses for each seat; and control apparatuses for each seat configured to control the lighting apparatuses for each seat.

9 Claims, 13 Drawing Sheets

<1301>

<1303>

<1305>

<401>
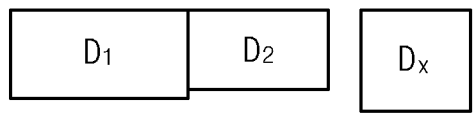
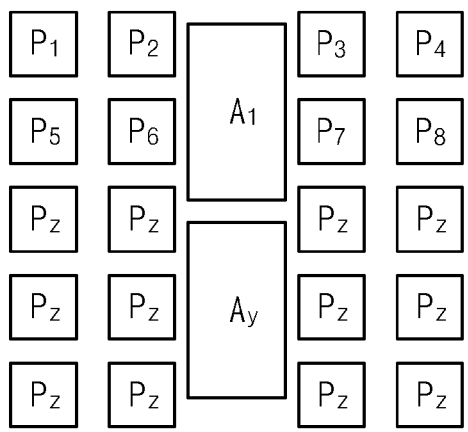
<403>
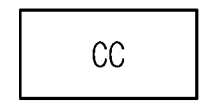
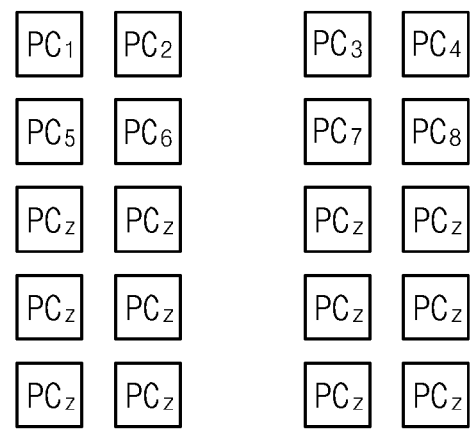
| | |
|---|---|
| $D_x$ | LIGHTING APPARATUS OF DRIVER'S SEAT |
| $A_y$ | PASSAGE LIGHTING APPARATUS |
| $P_z$ | LIGHTING APPARATUS FOR EACH SEAT |
| CC | CONTROL APPARATUS OF DRIVER'S SEAT |
| $PC_z$ | CONTROL APPARATUS FOR EACH SEAT |
Fig.4

| SUBJECT | CONTROL OBJECT | CONDITION | PRESENCE OR ABSENCE OF PERMISSION | POSSIBLE ATTRIBUTE | PROHIBITION ATTRIBUTE |
| --- | --- | --- | --- | --- | --- |
| DRIVER | LIGHTING OF DRIVER'S SEAT | DRIVING | Yes | WHITE, DAYLIGHT BLUE | |
| DRIVER | PASSAGE LIGHTING | DRIVING | Yes | | ATTRIBUTE CHANGE 1 SECOND OR LESS |
| DRIVER | PASSENGER LIGHTING | DRIVING | No | | |
| SUBJECT | PASSENGER LIGHTING | BEFORE DEPARTURE & SAFETY BELT IS NOT FASTENED | No | | |
| SUBJECT | PASSENGER LIGHTING | TIME: NIGHT | Yes | | VERY STRONG BRIGHTNESS |
| SUBJECT | PASSENGER LIGHTING | ARRIVE AT DESTINATION OR STOP | No | | |
| SUBJECT | PASSENGER LIGHTING | EMERGENCY SITUATION (INTERRUPT OF DRIVER) | No | | |

Fig.5

```xml
<?xml version="1.0"?>
<LIGHTING CONTROL>
<CONTROL ID="CONTROL 1">
<SUBJECT>DRIVER</SUBJECT>
<CONTROL OBJECT>LIGHTING OF DRIVER'S SEAT</CONTROL OBJECT>
<CONDITION>DRIVING</CONDITION>
<PRESENCE OR ABSENCE OF PERMISSION>YES</PRESENCE OR ABSENCE OF PERMISSION>
<POSSIBLE ATTRIBUTE>WHITE, DAYLIGHT BLUE</POSSIBLE ATTRIBUTE>
<PROHIBITION ATTRIBUTE></PROHIBITION ATTRIBUTE>
</CONTROL>
<CONTROL ID="CONTROL 2">
<SUBJECT>DRIVER</SUBJECT>
<CONTROL OBJECT>PASSAGE LIGHTING</CONTROL OBJECT>
<CONDITION>DRIVING</CONDITION>
<PRESENCE OR ABSENCE OF PERMISSION>YES</PRESENCE OR ABSENCE OF PERMISSION>
<POSSIBLE ATTRIBUTE></POSSIBLE ATTRIBUTE>
<PROHIBITION ATTRIBUTE>ATTRIBUTE CHANGE 1 SECOND OR LESS</PROHIBITION ATTRIBUTE>
</CONTROL>
<CONTROL ID="CONTROL 3">
<SUBJECT>DRIVER</SUBJECT>
<CONTROL OBJECT>PASSENGER LIGHTING</CONTROL OBJECT>
<CONDITION>DRIVING</CONDITION>
<PRESENCE OR ABSENCE OF PERMISSION>NO</PRESENCE OR ABSENCE OF PERMISSION>
<POSSIBLE ATTRIBUTE></POSSIBLE ATTRIBUTE>
<PROHIBITION ATTRIBUTE></PROHIBITION ATTRIBUTE>
</CONTROL>
<CONTROL ID="CONTROL 4">
<SUBJECT>PASSENGER</SUBJECT>
<CONTROL OBJECT>PASSENGER LIGHTING</CONTROL OBJECT>
<CONDITION>BEFORE DEPARTURE, SAFETY BELT IS NOT FASTENED</CONDITION>
<PRESENCE OR ABSENCE OF PERMISSION>NO</PRESENCE OR ABSENCE OF PERMISSION>
<POSSIBLE ATTRIBUTE></POSSIBLE ATTRIBUTE>
<PROHIBITION ATTRIBUTE></PROHIBITION ATTRIBUTE>
</CONTROL>
<CONTROL ID="CONTROL 5">
<SUBJECT>PASSENGER</SUBJECT>
<CONTROL OBJECT>PASSENGER LIGHTING</CONTROL OBJECT>
<CONDITION>TIME:NIGHT</CONDITION>
<PRESENCE OR ABSENCE OF PERMISSION>YES</PRESENCE OR ABSENCE OF PERMISSION>
<POSSIBLE ATTRIBUTE></POSSIBLE ATTRIBUTE>
<PROHIBITION ATTRIBUTE>VERY STRONG BRIGHTNESS</PROHIBITION ATTRIBUTE>
</CONTROL>
<CONTROL ID="CONTROL 6">
<SUBJECT>PASSENGER</SUBJECT>
<CONTROL OBJECT>PASSENGER LIGHTING</CONTROL OBJECT>
<CONDITION>ARRIVE AT DESTINATION OR STOP</CONDITION>
<PRESENCE OR ABSENCE OF PERMISSION>NO</PRESENCE OR ABSENCE OF PERMISSION>
<POSSIBLE ATTRIBUTE></POSSIBLE ATTRIBUTE>
<PROHIBITION ATTRIBUTE></PROHIBITION ATTRIBUTE>
</CONTROL>
<CONTROL ID="CONTROL 7">
<SUBJECT>PASSENGER</SUBJECT>
<CONTROL OBJECT>PASSENGER LIGHTING</CONTROL OBJECT>
<CONDITION>EMERGENCY SITUATION(INTERRUPT OF DRIVER)</CONDITION>
<PRESENCE OR ABSENCE OF PERMISSION>NO</PRESENCE OR ABSENCE OF PERMISSION>
<POSSIBLE ATTRIBUTE></POSSIBLE ATTRIBUTE>
<PROHIBITION ATTRIBUTE></PROHIBITION ATTRIBUTE>
</CONTROL>
</LIGHTING CONTROL>
```

Fig. 12

VEHICLE FOR SUPPORTING LIGHTING CONTROL FUNCTION

This application is based on and claims priority from Korean Patent Application No. 10-2013-0137830, filed on Nov. 13, 2013 in the Korean Intellectual Property Office, the disclosure of which is incorporated herein in its entirety by reference.

BACKGROUND OF THE INVENTION

1. Field of the Invention

The present invention relates to a lighting control of a vehicle, and more particularly, to a vehicle for supporting a lighting control function capable of more adaptively performing an interior lighting of the vehicle according to convenience of a user.

2. Description of the Prior Art

A vehicle is provided with various lighting apparatuses such as a front headlight and a rear brake light. The vehicle is also provided with apparatuses for an interior lighting. This lighting apparatus may be adjusted by a driver or a passenger. As an example, a vehicle such as a bus is provided with a lighting apparatus for each seat, which is capable of illuminating each seat, and a lighting apparatus for a driver's seat. The bus vehicle is also provided with a lighting apparatus for an interior passage.

However, since an interior lighting apparatus of a vehicle according to related art has the lighting apparatus for each seat provided in a manual form, there are various inconveniences in manipulating the lighting apparatus. Since a control apparatus manipulating the lighting apparatus for each seat is provided at a predetermined height, the driver or the passenger needs to deviate from the seat in order to manipulate the control apparatus. However, when the driver or passenger needs to move from the seat while the vehicle is being driven, this may cause a safety accident. In addition, since the control apparatus of the lighting apparatus for each seat is manually manipulated, it is unnecessary to use the lighting apparatus of a corresponding seat. Therefore, even in a situation in which it is necessary to control the lighting apparatus for each corresponding seat, it is difficult to manipulate the lighting apparatus. For example, a situation in which the driver needs to stop the driving in order to move from the driver's seat to manually manipulate the control of the lighting apparatus for each corresponding seat may occur.

SUMMARY OF THE INVENTION

Accordingly, the present invention has been made to solve the above-mentioned problems occurring in the prior art while advantages achieved by the prior art are maintained intact.

One subject to be achieved by the present invention is to provide a vehicle for supporting a lighting control function capable of allowing at least one of a driver and a passenger to more freely control interior lighting apparatuses provided in the vehicle.

In addition, another subject to be achieved by the present invention is to provide a vehicle for supporting a lighting control function capable of more actively setting authority for a control of interior lighting apparatuses of the driver or the passenger.

In addition, another subject to be achieved by the present invention is to provide a vehicle for supporting a lighting control function capable of supporting a color control of the interior lighting apparatuses and supporting illumination of the lighting having a specific color according to a preference of the driver or the passenger.

In addition, another subject to be achieved by the present invention is to provide a vehicle for supporting a lighting control function capable of applying a policy associated with the control of the interior lighting apparatuses to the control apparatus and supporting an update of a policy module associated with the policy application to be integrally performed.

In one aspect of the present invention, there is provided a vehicle for supporting a lighting control function, the vehicle including: interior lighting apparatuses configured to include a lighting apparatus of a driver's seat supporting a lighting of the driver's seat and lighting apparatuses for each seat supporting each lighting for each seat; a control apparatus of a driver's seat configured to perform a lighting control of at least one of the lighting apparatus of the driver's seat and the lighting apparatuses for each seat; and control apparatuses for each seat configured to control the lighting apparatuses for each seat.

The interior lighting apparatuses may further include a passage lighting apparatus for lighting a passage of the vehicle.

The control apparatus of the driver's seat may support a lighting control of the passage lighting apparatus.

The control apparatus of the driver's seat may support control authority grant of the control apparatuses for each seat.

The control apparatus of the driver's seat may receive and store a policy module or a policy update module including a control subject, a control object, a condition, a presence or absence of permission, a possible attribute, and a prohibition attribute of the interior lighting apparatuses.

The control apparatus of the driver's seat may extract a sub-module to be applied to the control apparatuses for each seat from the policy module or the policy update module and transmit the sub-module to the control apparatus for each seat.

The control apparatus of the driver's seat may receive a response to a reception of the sub-module from the control apparatuses for each seat and configure an acknowledgement table according to the corresponding response.

The control apparatus of the driver's seat may re-transmit the sub-module when not receiving a response message from at least one control apparatus for each seat among the control apparatuses for each seat.

The control apparatus for each seat may be a portable terminal mounted with an application supporting the control of the lighting apparatuses of each seat.

The portable terminal may perform adjustment of at least one of ON or OFF, a color, and brightness of the lighting apparatus for each seat.

BRIEF DESCRIPTION OF THE DRAWINGS

The above and other objects, features and advantages of the present invention will be more apparent from the following detailed description taken in conjunction with the accompanying drawings, in which:

FIG. 4 is a view for explaining a policy update module transmission according to an embodiment of the present invention;

FIG. 5 is a view showing an example of a policy module;

FIG. 12 shows an illustration of an XML form of the policy module in relation to the lighting control function.

DETAILED DESCRIPTION OF THE PREFERRED EMBODIMENTS

Hereinafter, exemplary embodiments of the present invention will be described in more detail with reference to the accompanying drawings. However, in describing the exemplary embodiment of the present invention, technology contents well known in the art to which the present invention pertains and directly not related to the present invention will be omitted, if possible. This is to more clearly deliver the key point of the present invention so as not to obscure the present invention by omitting an unnecessary description.

Figure 1:
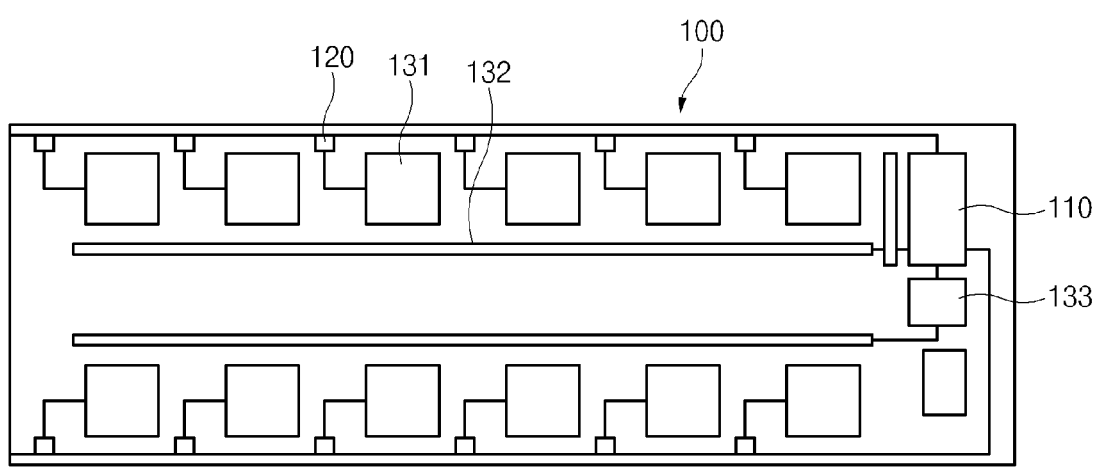
FIG. 1 is a view schematically showing an interior configuration of a vehicle to which a lighting control function according to an exemplary embodiment of the present invention is applied.
Figure 2:
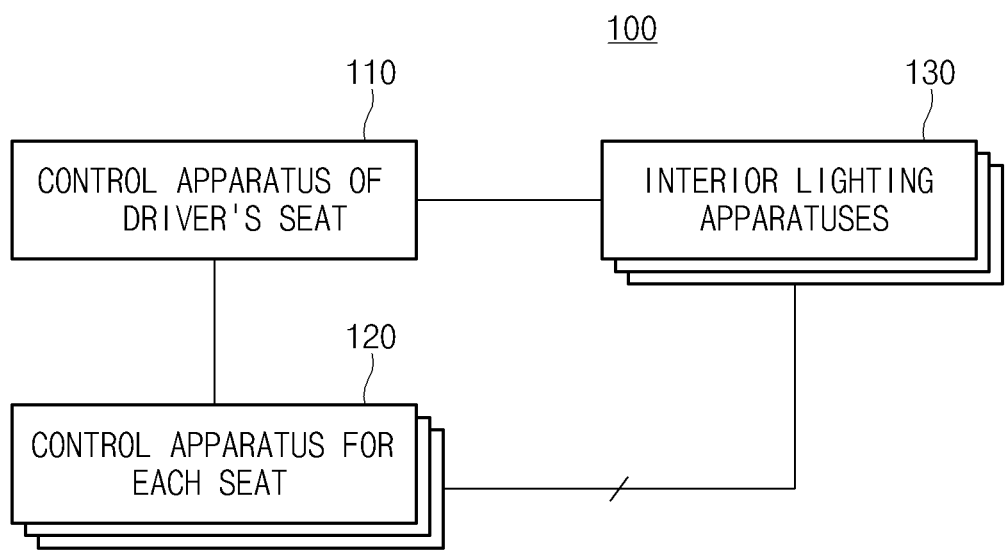
FIG. 2 is a block diagram schematically showing the vehicle to which the lighting control function according to the exemplary embodiment of the present invention is applied.

FIG. 1 is a view schematically showing an interior configuration of a vehicle to which a lighting control function according to an exemplary embodiment of the present invention is applied and FIG. 2 is a block diagram schematically showing the vehicle to which the lighting control function according to the exemplary embodiment of the present invention is applied. In addition, FIG. 3 is a view showing an example of a lighting arrangement and a control apparatus arrangement.

Figure 3:
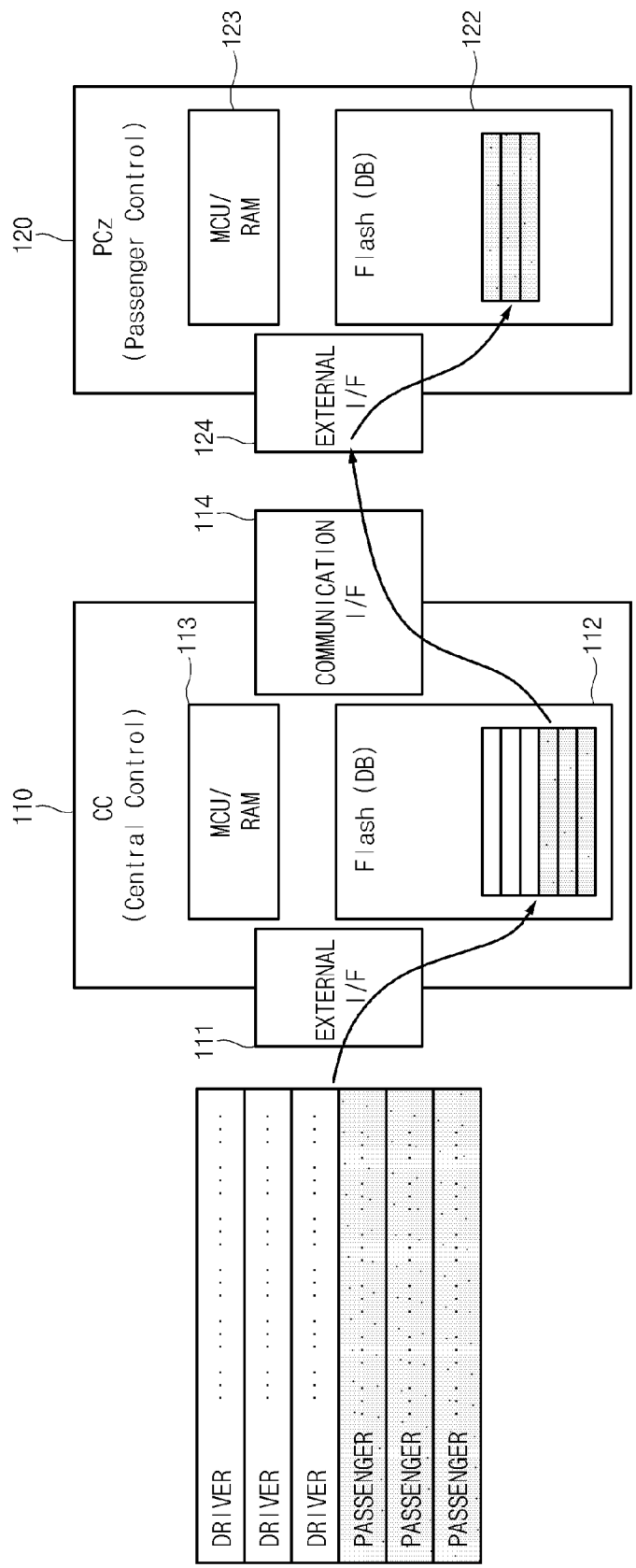
FIG. 3 is a view showing an example of a lighting arrangement and a control apparatus arrangement.

Referring to FIGS. 1 to 3, a vehicle 100 according to an exemplary embodiment of the present invention may include a control apparatus 110 of a driver's seat, control apparatuses 120 for each seat, and interior lighting apparatuses 130. Here, the interior lighting apparatuses 130 may include lighting apparatuses 131 for each seat, a passage lighting apparatus 132, and a lighting apparatus 133 of a driver's seat. As shown in reference numeral 401 of FIG. 4, the lighting apparatus 131 for each seat may be arranged for each seat and the passage light apparatus 132 may be arranged so as to illuminate a passage of the center of a seat arrangement. In addition, the lighting apparatus 133 of the driver's seat may be arranged so as to illuminate the driver's seat and a front of the vehicle 100, for example, a vehicle door.

The vehicle 100 having the above-mentioned configuration may support the interior lighting apparatuses 130 so as to be controlled by at least one of the control apparatus 110 of the driver's seat and the control apparatuses 120 for each seat. In this case, the vehicle 100 according to the exemplary embodiment of the present invention may support a policy with respect to ON or OFF or color setting for at least a portion of the interior lighting apparatuses 130 so as to be integrally applied. For example, the present invention does not alter the entire system such as firmware, or the like of the control apparatus whenever a change in each model, each object, or in respect to law of the vehicle 100 is generated, but supports the lighting control of the vehicle 100 so that the change may be easily reflected by the proposed policy update module.

The control apparatus 110 of the driver's seat may perform ON or OFF, a color change, a brightness control, and the like of the lighting apparatus 133 of the driver's seat arranged around the driver's seat. The control apparatus 110 of the driver's seat may include various forms of input apparatuses such as a button, a touch pad, and the like. When a specific input is input from the input apparatus, the control apparatus 110 of the driver's seat may control the lighting apparatus 133 of the driver's seat so as to correspond to the input. Meanwhile, the control apparatus 110 of the driver's seat may support a control of ON or OFF, a color, and brightness of the lighting apparatus 131 for each seat and the passage lighting apparatus 132. Therefore, when a specific input signal is generated according to a driver manipulation, the lighting apparatus 131 for each seat and the passage lighting apparatus 132 of a specific seat may be turned on or off, the color thereof may be changed or the brightness thereof may be changed according to the input signal.

The control apparatus 110 of the driver's seat may set control authority of the interior lighting apparatuses 130 of the control apparatuses 120 for each seat. For example, the control apparatus 110 of the driver's seat may grant authority for the lighting control of the lighting apparatus 131 for each seat arranged on at least one seat according to the driver manipulation or may withdraw the granted authority. In addition, the control apparatus 110 of the driver's seat may obtain the control authority for all the interior lighting apparatuses 130 and may support the lighting control of the interior lighting apparatuses 130 in a situation such as a case of an emergency situation, a case of an emergency situation to be informed of all passengers, a case in which the driver needs to call the attention to transfer information to all passengers, a case in which a guide needs to call the attention to explain a tour or transfer notices when traveling, or the like. As shown in reference numeral 403 of FIG. 4, the control apparatus 110 of the driver's seat may be arranged at a front of the vehicle 100, and may be particularly arranged at a position capable of being manipulated by the driver or a position capable of being manipulated by the guide or a passenger representative.

The control apparatus 120 of each seat may perform the control of the lighting apparatus 131 for each seat according to authority grant of the lighting control of the control apparatus 110 of the driver's seat. The control apparatus 120 for each seat may be separately arranged for each seat. In addition, the control apparatus 120 for each seat may control ON or OFF, the color, and the brightness of the lighting apparatus 131 for each seat arranged for each seat. Additionally, the control apparatus 120 for each seat may be provided in a form of a portable terminal. A specific portable terminal may be mounted with an application for controlling the lighting apparatus 131 for each seat arranged at a specific seat of a specific vehicle 100. In addition, in the case in which the portable terminal activates the corresponding application, the portable terminal may output a control screen so as to control the lighting apparatus 131 for each seat of the corresponding seat.

Here, the portable terminal may authenticate a sitting list so as to only control the lighting apparatus 131 for each seat for a designated seat. During this process, the portable terminal may obtain control authority for controlling the lighting apparatus 131 for each seat of a specific seat from the control apparatus 110 of the driver's seat. When the portable terminal requests authority as the control apparatus 120 for each seat, the control apparatus 110 of the driver's seat may grant the control authority according to the driver manipulation. The control apparatus 120 for each seat may be arranged for each seat as shown in reference numeral 403 of FIG. 4.

The interior lighting apparatuses 130 may include at least one of the lighting apparatus 133 of the driver's seat, the lighting apparatuses 131 for each seat, and the passage lighting apparatus 132. The interior lighting apparatuses 130 as described above may be configured to include at least one LED in order to adjust a lighted color. Here, the LED may be a form of a RGB LED capable of implementing a plurality of colors. In addition, the interior lighting apparatuses 130 may include a current adjusting apparatus or a voltage adjusting apparatus in order to adjust brightness. The interior lighting apparatuses 130 may adjust at least one of a current and a voltage supplied to the LED according to a control signal transmitted from at least one of the control apparatus 110 of the driver's seat and the control apparatus 120 for each seat, thereby performing the brightness adjustment.

The lighting apparatuses 131 for each seat may include a plurality of lighting apparatuses separately arranged for each seat. The lighting apparatuses 131 for each seat may limit an angle so as to illuminate only the specific seat. The lighting apparatuses 131 for each seat may be configured by a plurality of LEDs in order to control ON or OFF, the color, and brightness. In the case in which the control authority of the lighting apparatuses 131 for each seat is temporarily transferred to the control apparatus 110 of the driver's seat, lighting set values set for the lighting apparatuses 131 for each seat may be preserved. In addition, in the case in which the control apparatuses 120 for each seat again obtain the control authority, the lighting apparatuses 131 for each seat may restore previous color and brightness by the preserved set value. Meanwhile, the lighting apparatuses 131 for each seat may be forcedly controlled in a situation such as a situation disrupting safety, before the vehicle's departure. For example, the lighting apparatuses 131 for each seat may be displayed by a specific color when a safety belt is not fastened to thereby guide an alarm. In addition, the lighting apparatuses 131 for each seat may have a limitation in adjusting the color thereof to a color capable of causing inconvenience to a side seat passenger according to a time zone. For example, the lighting apparatuses 131 for each seat may have a limitation in adjusting brightness thereof to a lighting having brightness of a predetermined level or more when the vehicle 100 is driven at night. In addition, in the case in which the vehicle arrives at a destination or arrives at a stop, the lighting apparatuses 131 for each seat may be adjusted to the color or brightness for informing that the vehicle arrives at the destination or waking the passengers, or may transfer the control authority to the control apparatus 110 of the driver's seat.

The passage lighting apparatus 132 has a predetermined length so as to illuminate the passage and at least one passage lighting apparatus 132 may be arranged. The passage lighting apparatus 132 may also perform the control of the color or brightness, and ON or OFF. Particularly, the passage lighting apparatus 132 may be controlled by the control apparatus 110 of the driver's seat. Alternatively, in some cases, the passage lighting apparatus 132 may be controlled by the control apparatus for each seat arranged at the specific seat. The passage lighting apparatus 132 as described above is limited so as not to have the color or brightness such as a flashy color or the glitter when driving the vehicle, such that the lighting control threatening the safety, in which the passengers get up from their seats and dance, may be limited.

The lighting apparatus 133 for the driver's seat has control authority set so as to be controlled by only the control apparatus 110 of the driver's seat. Alternately, the lighting apparatus (133) of the driver's seat may be set so as to control only the control apparatus 120 for each seat at which a specific passenger designated by the driver, for example, the guide or the passenger representative is seated. The passage lighting apparatus 132 and the lighting apparatus 133 for the driver's seat may also be configured by the plurality of LEDs in order to control the color or brightness. The lighting apparatus 133 of the driver's seat as described above may not be controlled so as to have the color or brightness pre-set as a lighting disturbing a driving when driving the vehicle. For example, the lighting apparatus 133 of the driver's seat may be limited so as not to be adjusted to the color or brightness such as deep red, blue, or the like as a primary color disturbing distinction of traffic lights. In addition, the lighting apparatus 133 of the driver's seat may be limited so as not to be adjusted to the color or brightness capable of causing the driver to be drowsy.

As described above, in the vehicle 100 for supporting the lighting control function, at least one of the driver and the passenger may be a control subject. In addition, one or portions of the passengers, for example, the guide or the passenger representative may have authority of the driver. The lighting control function of the vehicle 100 may include a lighting color, brightness, and control authority grant as control items and a control target may be the driver's seat lighting, a passage lighting, and a seat lighting, wherein the respective lightings may be configured by a plurality of lightings and may be differently controlled. Since the respective lightings have identification ID different from each other, the control module may distinguish the ID.

FIG. 4 is a view for explaining a policy update module transmission according to an embodiment of the present invention and FIG. 5 is a view showing an example of a policy module.

Referring to FIG. 4, the policy update modules may include update information in relation to the control apparatus 110 of the driver's seat and the control apparatuses 120 for each seat. The control apparatus 110 of the driver's seat may include an external communication interface 111, a first database 112, a first processing unit 113, and a first communication interface 114, as shown. The control apparatuses 120 for each seat may include a second communication interface 124, a second database 122, and a second processing unit 123.

The policy update module may be transmitted through the external communication interface 111 of the control apparatus 110 of the driver's seat and may be stored in the first database 112. In addition, a sub module which is needed to be transmitted to the control apparatuses 120 for each seat among the policy update modules may be extracted by the first processing unit 113. The extracted sub module may be transmitted through the first communication interface 114 and the second communication interface of the control apparatuses 120 for each seat and may be stored in the second database 122. The sub module stored in the second database 122 may be applied to the control of the lighting apparatus 131 for each seat by the second processing unit 123.

In relation to the policy module, as described above, approval of control authority, the color which may not be set, and the like may be changed due to a change of a company policy, a change of law, and the like. According to the present invention, the policy module may be designed so as to update information of the policy change by one module and may be designed so as to easily transmit and reflect information of the policy change to the control apparatus 120 for each seat.

The policy module or the policy update module may include information specifying the presence or absence of permission for a control subject that may control the lighting apparatus, which is a control object, under any condition, and permission and prohibition of attribute, as shown in FIG. 5. Here, the attribute may include the color, brightness, and a changing interval (a difference between changed times of an immediately previous change and a current change). The policy module or the policy update module may be designed so as to have a form of data structure such as an XML and may be operated by the control apparatus. The respective fields of the policy update module may include a control subject field, a control object field, a condition field, a permission presence or absence field, a possible attribute field, and a prohibition attribute field. The control subject field may have setting information about the driver, the passenger, or whether one or more of the passengers may use authority of the driver. The control object field may have setting information about at least one of a lighting of the driver's seat, a passage lighting, and a lighting of a passenger seat. The condition field may have setting information about a combination of various inputs, for example, a driving condition, a time, whether or not the safety belt is not fastened, and the like. The permission presence or absence field may have YES or NO setting information. The possible attribute field may have setting information about the color, brightness, an attribute change interval, and the like. The prohibition attribute field may have setting information about the color, brightness, the attribute change interval, and the like. Here, only one of the possible attribute and the prohibition attribute has a value. That is, if one of the possible attribute and the prohibition attribute has the value, then the other may be set to a state (NULL) without having the value.

The method for transmitting the policy update module as described above may be differently implemented according to a case of a central controlling scheme controlling the interior lighting apparatus 130 by the control apparatus 110 of the driver's seat, or a case controlling the interior lighting apparatus 130 in a distributed controlling scheme including the control apparatus 110 of the driver's seat and the control apparatuses 120 for each seat.

In the case of the central controlling scheme based on the control apparatus 110 of the driver's seat, for example, an LED lighting control system interlocked with a navigation system of a bus driver may be implemented so as to control all lighting modules. In this case, the policy update module may be transmitted to only the control apparatus 110 of the driver's seat. In a case of the central controlling scheme, the control apparatuses 120 for each seat may apply the policy update module by an input which is directly input by the passenger at the seat or may receive and process the policy update module by connecting to an AP, or the like present in the vehicle using the portable terminal such as a smart phone.

In a case of the distributed controlling scheme based on the control apparatus 110 of the driver's seat and the control apparatuses 120 for each seat, it may be implemented in a form in which the policy update module is transmitted to the control apparatus 110 of the driver's seat, the control apparatus 110 of the driver's seat extracts the sub module to be transmitted to the control apparatuses 120 for each seat from the policy update module, and the extracted sub module is transmitted to the control apparatuses 120 for each seat.

FIGS. 6 to 11 are views for explaining policy module transmitting schemes in relation to the lighting control function.

Figure 6:
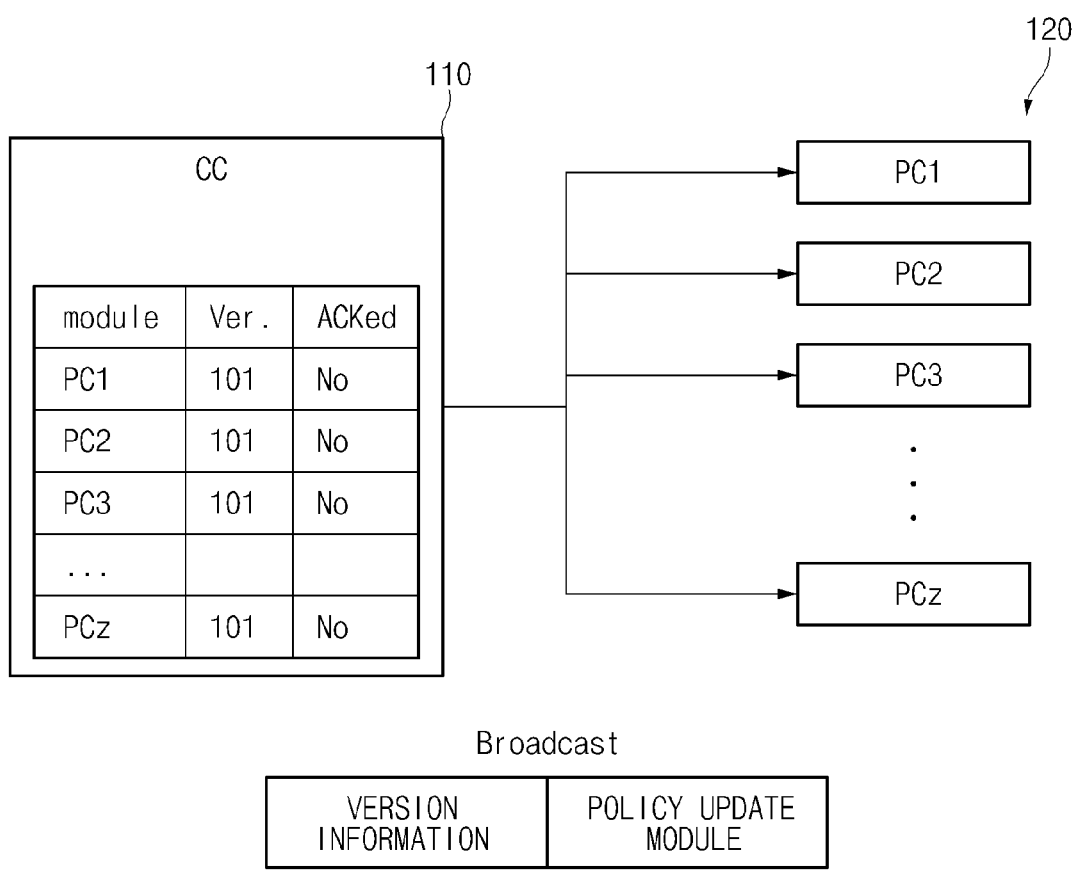
FIG. 6 is a view showing a process transmitting policy module data from a control apparatus performing a central control scheme, for example, a control apparatus of a driver's seat to control apparatuses for each seat.

First, FIG. 6 is a view showing a process transmitting policy module data from a control apparatus performing a central control scheme, for example, a control apparatus 110 of a driver's seat to a control apparatuses 120 for each seat. As shown in FIG. 6, the control apparatus 110 of the driver's seat may transmit policy module data to the control apparatuses 120 for each seat in a broadcast. Version information may be assigned in an increasing form from the control apparatus 110 of the driver's seat according to newly arrived information. In this case, the control apparatus 110 of the driver's seat may write version information in an acknowledgement table and may set whether or not it is acknowledged to NO.

Figure 7:
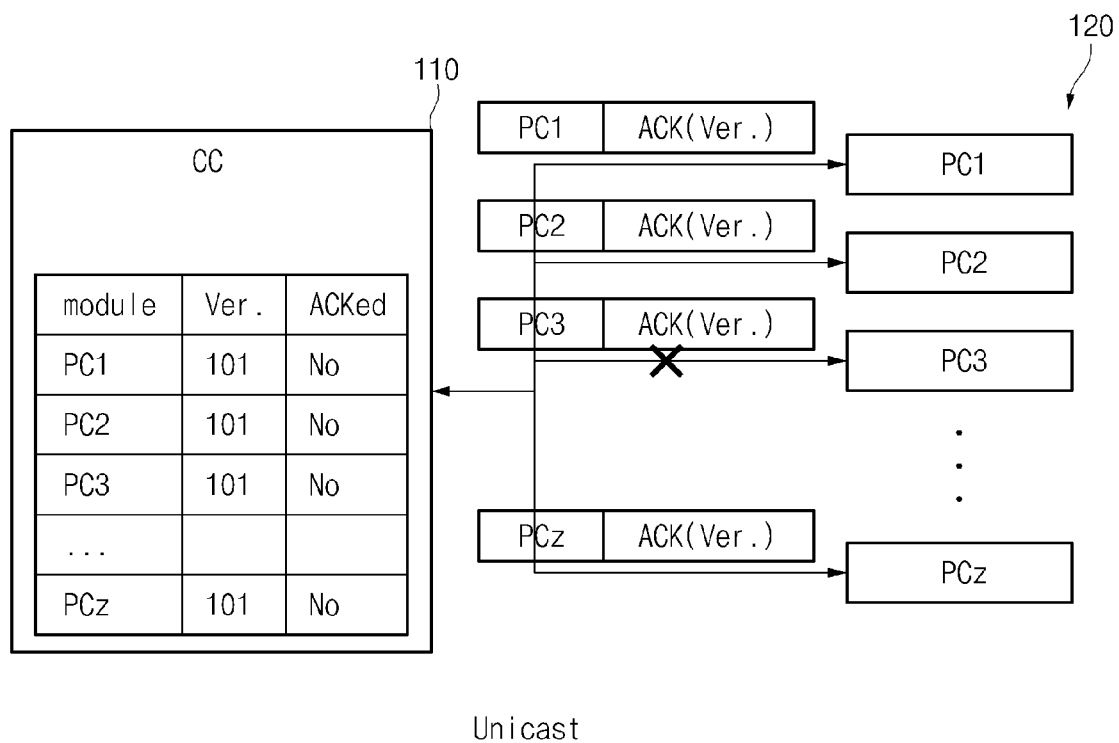
FIG. 7 is a view for explaining a response of the control apparatuses for each seat receiving the policy module in relation to the lighting control function.

FIG. 7 is a view for explaining responses of the control apparatuses for each seat receiving the policy module in relation to the lighting control function.

As shown in FIG. 7, the respective control apparatuses 120 for each seat may transmit an ACK message for acknowledging a corresponding message to the control apparatus 110 of the driver's seat in a predetermined scheme, for example, a unicast scheme after receiving the policy module. In this case, the ACK message may include version information. Meanwhile, when at least one of the control apparatuses 120 for each seat, for example, a third control apparatus PC3 for each seat does not receive policy module data or fails in the transmission of the acknowledgement message, the third control apparatus PC3 for each seat does not transmit the ACK message to the control apparatus 110 of the driver's seat.

Figure 8:
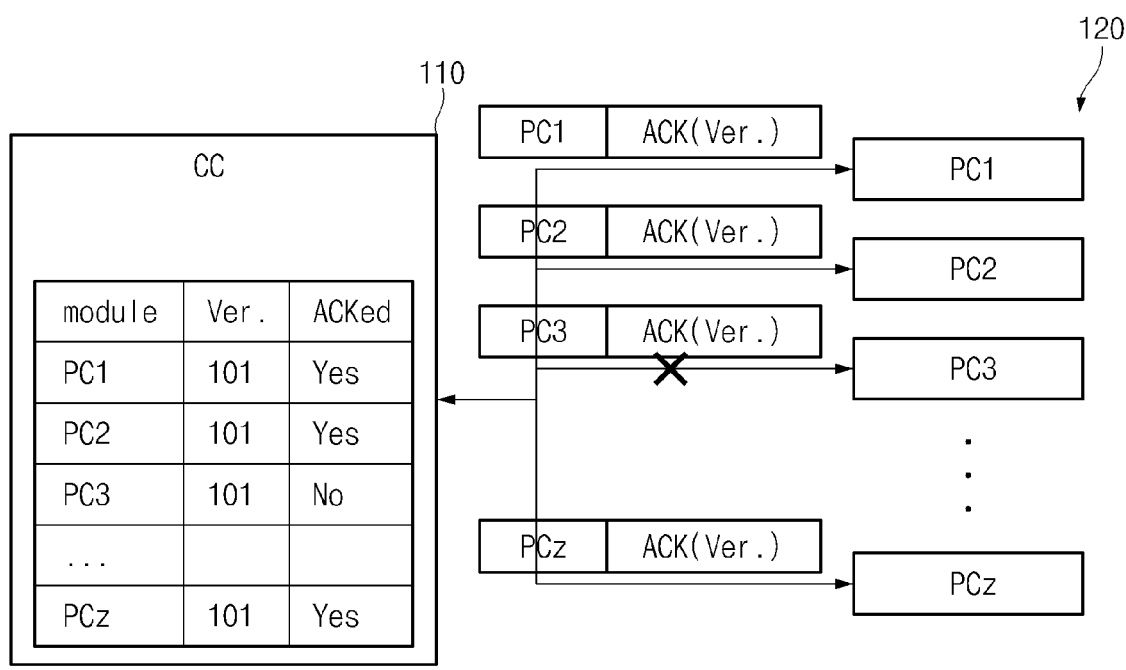
FIG. 8 is a view for explaining an acknowledgement table change of the control apparatus of the driver's seat in relation to the lighting control function.

FIG. 8 is a view for explaining an acknowledgement table change of the control apparatus of the driver's seat in relation to the lighting control function.

Referring to FIG. 8, if the control apparatus 110 of the driver's seat performing the central control scheme receives the ACK message in which version information matches a version transmitted to the control apparatuses 120 for each seat, it may indicate YES in the acknowledgement table. Meanwhile, the control apparatus 110 of the driver's seat may maintain NO, which is an original state, for the items which do not receive the ACK message due to a transmission error, or the like.

Figure 9:
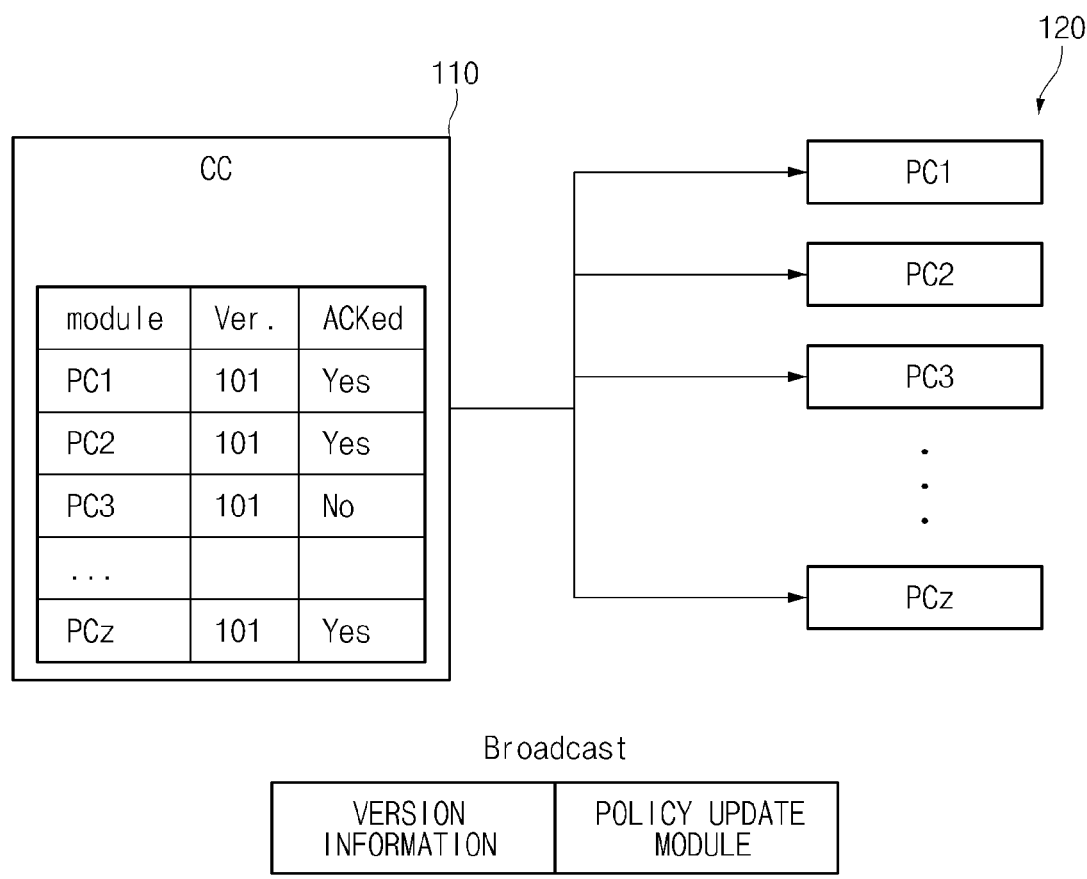
FIG. 9 is a view for explaining policy module re-transmission of the control apparatus of the driver's seat in relation to the lighting control function.

FIG. 9 is a view for explaining policy module re-transmission of the control apparatus of the driver's seat in relation to the lighting control function.

Referring to FIG. 9, the control apparatus 110 of the driver's seat may transmit the policy module, may then configure the acknowledgement table according the reception of the ACK message for the policy module, and may check whether the ACK message is received from all the control apparatuses 120 for each seat. In this case, when the ACK message is not received from all the control apparatuses 120 for each seat, the control apparatus 110 of the driver's seat may again broadcast the policy module or the policy update module to all the control apparatuses 120 for each seat. Alternatively, the control apparatus 110 of the driver's seat may transmit the policy module to the control apparatus for each seat which does not receive the ACK message, for example, the third control apparatus PC3 for each seat according to a design scheme.

Figure 10:
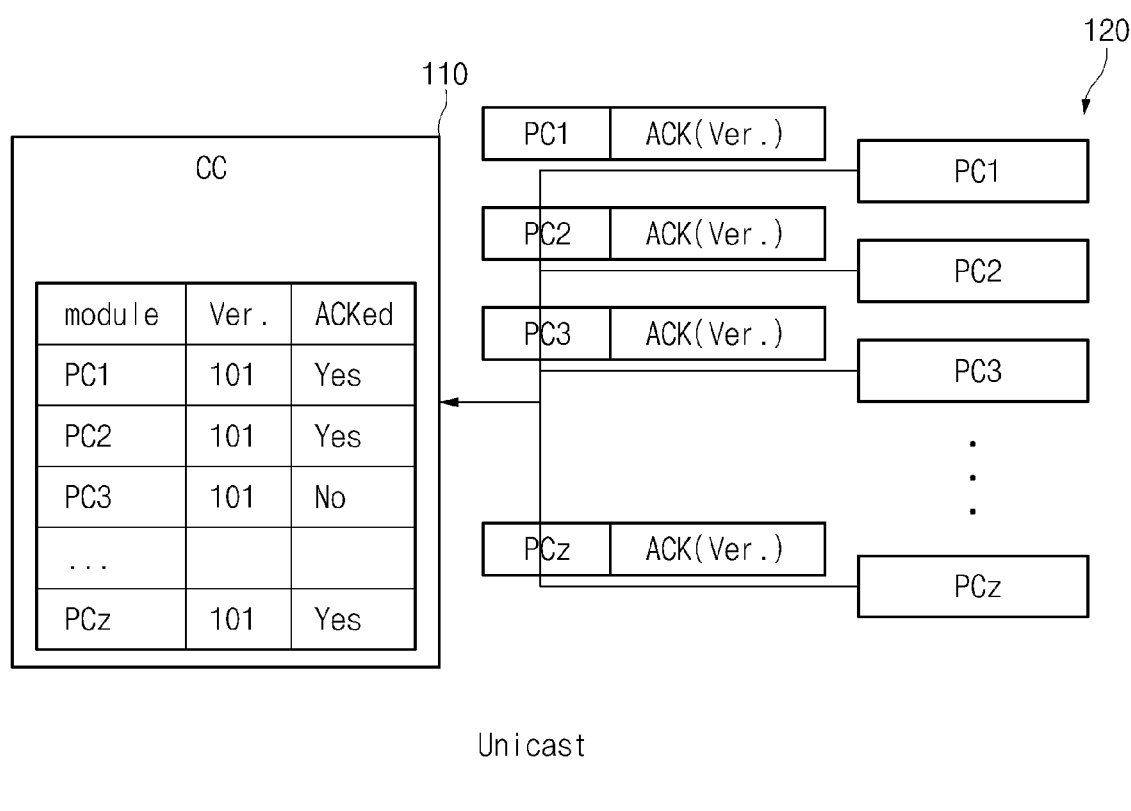
FIG. 10 is a view for explaining responses of the control apparatuses for each seat in relation to the lighting control function.

FIG. 10 is a view for explaining responses of the control apparatuses for each seat in relation to the lighting control function.

Referring to FIG. 10, the control apparatuses 120 for each seat may transmit the ACK message to the control apparatus 110 of the driver's seat according to the reception of the policy module or the policy update module from the control apparatus 110 of the driver's seat. The control apparatus 110 of the driver's seat performing the central control scheme may indicate YES in the acknowledgement table in the case in which version information of the ACK message provided by the control apparatuses 120 for each seat match the transmitted version, and may maintain NO, which is the original state, in which the ACK message is not received due to the transmission error, or the like. In FIG. 10, the acknowledgement table of the control apparatus 110 of the driver's seat may become a state before receiving the ACK message from the control apparatuses 120 for each seat.

Figure 11:
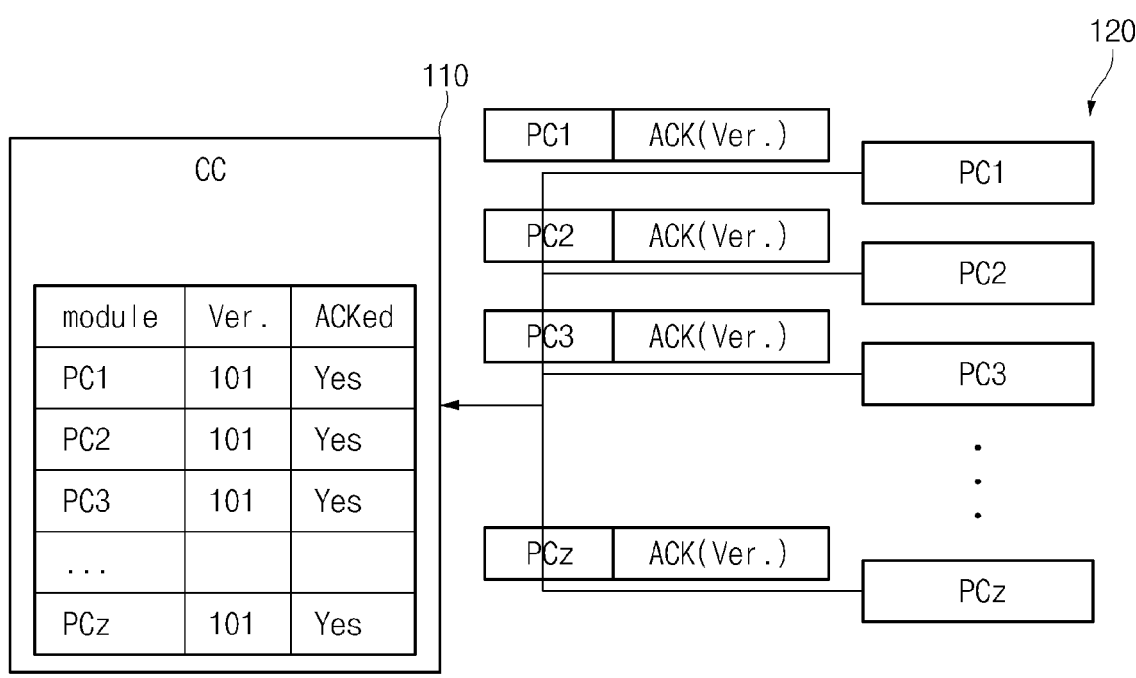
FIG. 11 is a view for explaining an acknowledgement table change of the control apparatus of the driver's seat in relation to the lighting control function.

FIG. 11 is a view for explaining an acknowledgement table change of the control apparatus of the driver's seat in relation to the lighting control function.

Referring to FIG. 11, as all the control apparatuses 120 for each seat transmit the ACK message, the control apparatus 110 of the driver's seat may perform an update of the acknowledgement table according to the reception state of all the ACK messages. When all the ACK messages are received, the control apparatus 110 of the driver's seat may stop the broadcast of the policy module or the policy update module.

Meanwhile, in the case in which the control apparatus 110 of the driver's seat re-transmits the policy module or the policy update module to the control apparatus for each seat which does not receive the policy module or the policy update module, the control apparatus 110 of the driver's seat may perform an acknowledgement of the ACK message from the corresponding control apparatus for each seat and may control the maintenance or the stop of the re-transmission of the policy module or the policy update module in respond to the acknowledgement of the ACL message.

The policy module to be applied to the control apparatuses for each seat may be a sub-module corresponding to portions of all the policy modules received by the control apparatus 110 of the driver's seat. A method of updating the sub-module may be performed by transmitting only a rule-based data structure of an XML form. This scheme is possible in an embedded system and may use a file system such as JFFS2 in a case of using Flash. In addition, the method of updating the sub-module may be performed by transmitting an execution binary form including the data structure. This scheme may be a concept of installing a new execution file. Assuming that the system is an embedded Linux, it is possible to support a user to freely install several software using a package managing system such as ipkg or opkg. In a case of using flash, the file system such as JFFS2 may be used.

FIG. 12 shows an illustration of an XML form of the policy module in relation to the lighting control function.

Referring to FIG. 12, the policy module may be classified into the driver and the passenger for each the control subject and may include items such as the control object, the presence or absence of permission, the possible attribute, the prohibition attribute, and the like.

Figure 13:
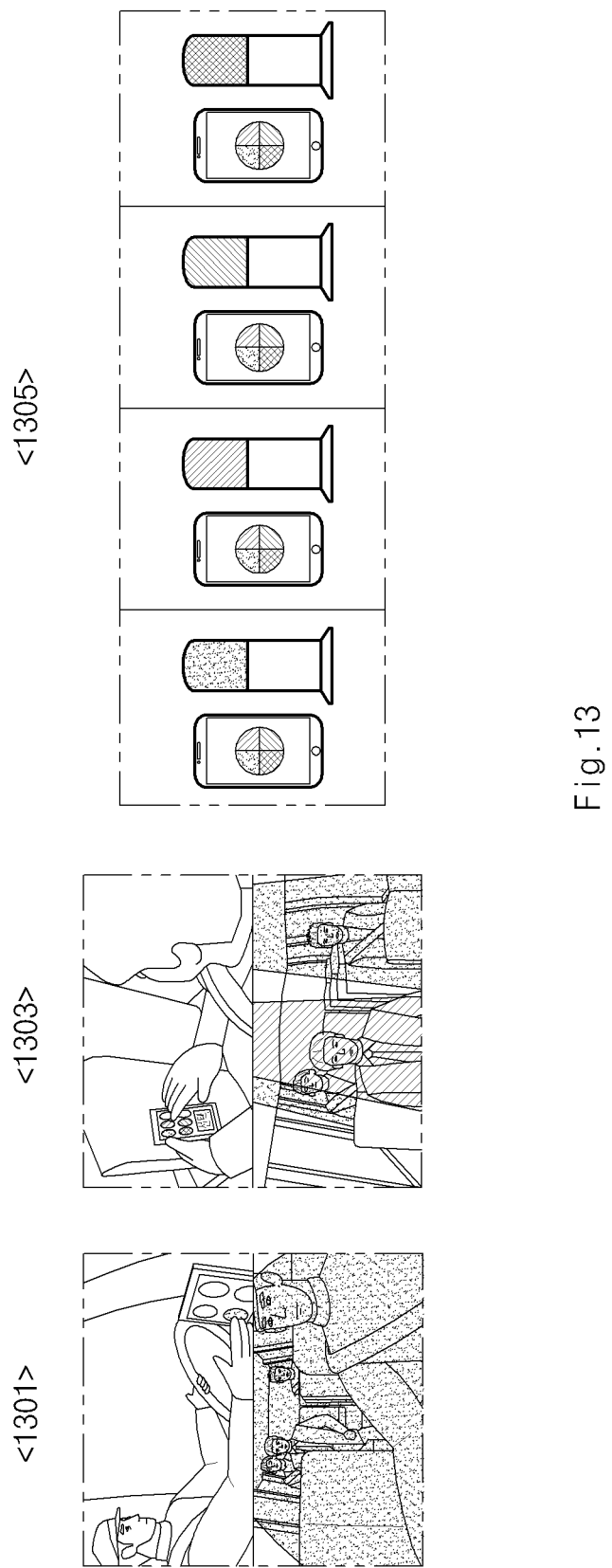
FIG. 13 illustrates situations in which the lighting control function according to the exemplary embodiment of the present invention is applied.

FIG. 13 illustrates situations in which the lighting control function according to the exemplary embodiment of the present invention is applied.

Referring to FIG. 13, the present invention may provide the control apparatus 110 of the driver's seat in order to control the interior lighting apparatus 130 and as shown in reference numeral 1301, the control apparatus 110 of the driver's seat may support the control of the interior lighting apparatus 130 through a simplified UI as shown. In addition, the present invention may support a control for each individual passenger, for example, a lighting color, illumination, a lighting color changing speed, or the like by operating the control apparatus 120 for each seat as shown in reference numeral 1303. In addition, the present invention may support an application of operation function of the control apparatuses 120 for each seat to the portable terminal of the passenger as shown in reference numeral 1305.

The present invention does not permit the controls of all the interior lighting apparatuses 130 and may limit the controls depending on the situation, the condition, and the time. To this end, the present invention provides the policy module. In addition, when a new policy is introduced through the policy update module, the present invention may support an integral update of the entire firmware without having a need to repair the entire firmware of the vehicle 100 one by one. In addition, the present invention may separately apply the policy update module to the control apparatus of the driver's seat (central control) and the control apparatus for each seat (distributed control), such that it may more efficiently support the module update of several control apparatuses 120 for each seat by one policy update module.

According to the exemplary embodiment of the present invention, the vehicle for supporting the lighting control function may adaptively control the interior lighting apparatuses of the vehicle according to the need of the driver and the passenger.

In addition, the intensity, the color, or the like of the lighting may be adjusted in various forms according to the request of the passenger.

All the entire interior lighting apparatuses may be integrally or separately adjusted according to the need of the driver.

In addition, the present invention provides the policy associated with the lighting control as the policy module and updates the policy module, thereby making it possible to support the lighting control function so that the corresponding policy may be separately or integrally applied to each of the control apparatus of the driver's seat and the control apparatuses for each seat.

The exemplary embodiments of the present invention have been disclosed in the present specification and the accompanying drawings and specific terms have been used, but are just used in a general meaning in order to easily describe the technical content of the present invention and assist in understanding the present invention and do not limit the scope of the present invention. It is obvious to those skilled in the art to which the present invention pertains that various modifications may be practiced based on the technical idea of the present invention, in addition to the exemplary embodiments disclosed herein.

What is claimed is:

1. A vehicle for supporting a lighting control function, the vehicle comprising:
   interior lighting apparatuses configured to include a lighting apparatus of a driver's seat supporting a lighting of the driver's seat and lighting apparatuses for each seat supporting each lighting for each seat;
   a control apparatus of a driver's seat configured to perform a lighting control of at least one of the lighting apparatus of the driver's seat and the lighting apparatuses for each seat, wherein the control apparatus of the driver's seat receives and stores a policy module or a policy update module including a control subject, a control object, a condition, a presence or absence of permission, a possible attribute, and a prohibition attribute of the interior lighting apparatuses; and
   control apparatuses for each seat configured to control the lighting apparatuses for each seat.

2. The vehicle according to claim 1, wherein the interior lighting apparatuses further include a passage lighting apparatus for lighting a passage of the vehicle.

3. The vehicle according to claim 2, wherein the control apparatus of the driver's seat supports a lighting control of the passage lighting apparatus.

4. The vehicle according to claim 1, wherein the control apparatus of the driver's seat supports control authority grant of the control apparatuses for each seat.

5. The vehicle according to claim 1, wherein the control apparatus of the driver's seat extracts a sub-module to be applied to the control apparatuses for each seat from the policy module or the policy update module and transmits the sub-module to the control apparatus for each seat.

6. The vehicle according to claim 5, wherein the control apparatus of the driver's seat receives a response to a reception of the sub-module from the control apparatuses for each seat and configures an acknowledgement table according to the corresponding response.

7. The vehicle according to claim 6, wherein the control apparatus of the driver's seat re-transmits the sub-module when not receiving a response message from at least one control apparatus for each seat among the control apparatuses for each seat.

8. The vehicle according to claim 1, wherein the control apparatus for each seat is a portable terminal mounted with an application supporting the control of the lighting apparatuses of each seat.

9. The vehicle according to claim 8, wherein the portable terminal performs adjustment of at least one of ON or OFF, a color, and brightness of the lighting apparatus for each seat.

* * * * *